United States Patent [19]

Horikiri

[11] Patent Number: 4,776,914

[45] Date of Patent: Oct. 11, 1988

[54] PASTED PICTURE MANUFACTURING METHOD

[75] Inventor: Yataro Horikiri, Tokyo, Japan

[73] Assignee: Wakaba Co., Ltd., Tokyo, Japan

[21] Appl. No.: 111,176

[22] Filed: Oct. 22, 1987

[51] Int. Cl.[4] ............ B32B 31/04

[52] U.S. Cl. ............ 156/247; 156/306.6; 156/267; 156/289; 428/13; 428/46; 434/96; 446/901

[58] Field of Search ............ 156/247, 248, 249, 289, 156/306.3, 306.6, 267; 434/84, 96; 446/901; 428/13, 41, 46, 47

[56] References Cited

U.S. PATENT DOCUMENTS

| | | | |
|---|---|---|---|
| 3,574,017 | 4/1971 | Kass | 428/13 |
| 3,909,329 | 9/1975 | Smolen | 156/247 |
| 4,262,042 | 4/1981 | Bruskin | 428/13 |

*Primary Examiner*—Caleb Weston

*Attorney, Agent, or Firm*—Fleit, Jacobson, Cohn & Price

[57] ABSTRACT

A pasted picture manufacturing method capable of completely omitting by using a double-coated adhesive tape such a laborious operation for pasting decorative paper such as Japan paper, which constitutes a pasted picture, on a rough sketch, and of completing a pasted picture by merely sticking Japan paper, which forms an object picture, to the upper surface of a transparent board so that the picture is aligned with the rough sketch on a rough sketch-carrying plate fixed to the lower surface of the transparent board.

2 Claims, 3 Drawing Sheets

PASTED PICTURE MANUFACTURING METHOD

BACKGROUND OF THE INVENTION

The present invention relates to a pasted picture manufacturing method capable of pasting a picture very easily on a transparent board which constitutes a substrate of the complete pasted picture.

In a conventional pasted picture manufacturing method, a pasted picture is produced by pasting a rough sketch-carrying plate on a board; or drawing a rough sketch on a plate, drawing a picture identical with the rough sketch on Japan paper which is a special paper made with an irregular mottled effect on the surface, cutting out this picture from the Japan paper and pasting the resultant picture on the rough sketch; or applying a pattern, on which a picture identical with a rough sketch is drawn, to Japan paper, cutting out the Japan paper along the contour of the pattern and pasting the resultant Japan paper on the rough sketch. Accordingly, when Japan paper constituting a pasted picture is fixed to a rough sketch, a pasting operation is necessarily carried out. This makes it necessary to prepare paste, a dish and a brush. Moreover, it takes much labor to carry out such a pasting operation.

SUMMARY OF THE INVENTION

The present invention has been developed in view of the facts described above.

An object of the present invention is to provide a pasted picture manufacturing method capable of completely omitting by using a double-coated adhesive tape such a laborious operation for pasting Japan paper, which constitutes a pasted picture, on a rough sketch, and of completing a pasted picture by merely sticking Japan paper, which forms an object picture, to the upper surface of a transparent board so that the picture is aligned with the rough sketch on a rough sketch-carrying plate fixed to the lower surface of the transparent board.

Another object of the present invention is to provide a pasted picture manufacturing method, which enables a beautiful pasted picture to be made very easily by using scissors only, without requiring any special techniques.

A pasted picture manufacturing method according to the present invention comprises the steps of sticking a rough sketch-carrying plate to the lower surface of a transparent board, drawing a reversed picture of the rough sketch on the upper surface of upper peelable, release paper of an upper and lower peelable paper-carrying double-coated adhesive tape, cutting off the upper and lower peelable paper and the double-coated adhesive tape along the contour of the picture, removing the lower peelable paper from the resultant picture and upper and lower peelable paper-carrying double-coated adhesive tape, applying the rear surface of a decorative paper such as Japan paper to the portion of the double-coated adhesive paper from which the lower peelable paper has been removed, cutting off the peripheral portion of the Japan paper along the contour of the picture, removing the upper peelable paper from the double-coated adhesive tape, sticking the Japan paper to the upper surface of the transparent board via the double-coated adhesive tape fixed to the rear surface of the Japan paper, in such a manner that the picture is aligned with the rough sketch, which can be seen through the transparent board, on the rough sketch-carrying plate, and removing the rough sketch-carrying plate from the lower surface of the transparent board.

PREFERRED EMBODIMENT OF THE INVENTION

An embodiment of the pasted picture manufacturing method according to the present invention will now be described in detail.

Figure 1:
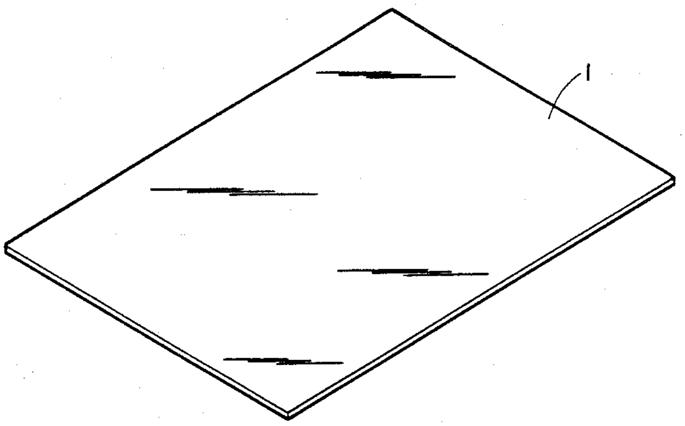
FIG. 1 is a perspective view of a transparent board.
Figure 2:
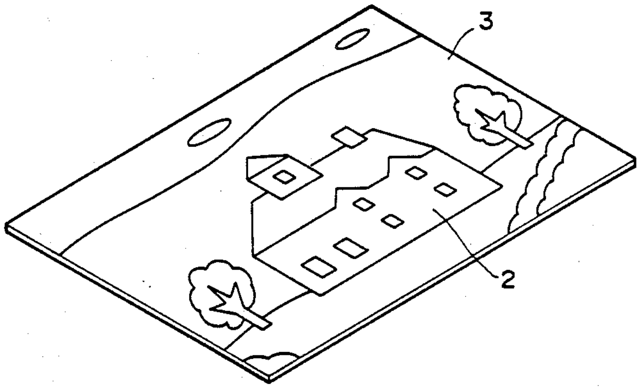
FIG. 2 is a perspective view of a rough sketch-carrying plate.
Figure 3:
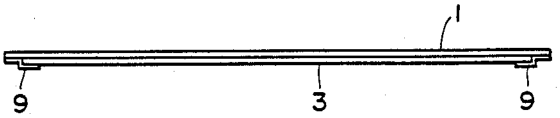
FIG. 3 is a front elevation of the transparent board and rough sketch-carrying plate attached to the lower surface thereof.

A transparent board 1 made of a transparent acrylic plate or a glass plate, and a rough sketch 2 consists of letters or symbols or a picture which is printed or drawn on the upper surface of a rough sketch plate 3 as shown in FIG. 2. This rough sketch plate 3 is applied closely to the lower surface of the transparent board 1 and fastened thereto by a cellophane adhesive tape 9 as shown in FIG. 3.

Figure 5:
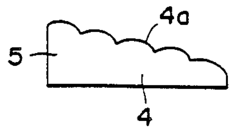
FIG. 5 is a plan view of a part of the double-coated adhesive tape, which is obtained by cutting the upper and lower peelable paper and double-coated adhesive tape along the contour of a part of the picture.
Figure 4:
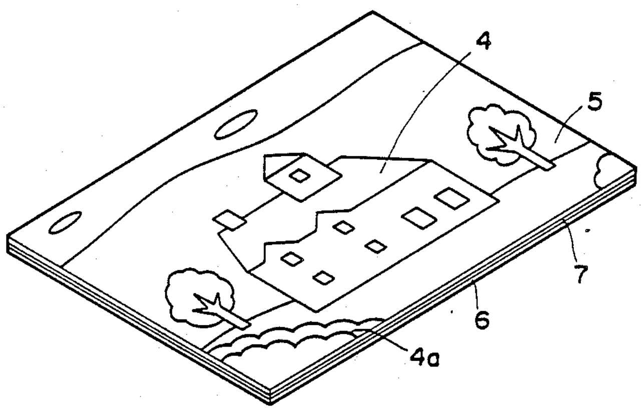
FIG. 4 is a perspective view of a double-coated adhesive tape with a reversed picture of the rough sketch drawn on the upper surface of the upper peelable paper set on this tape.
Figure 6:
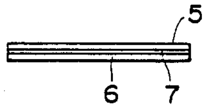
FIG. 6 is a front elevation of a cut-out picture portion shown in FIG. 5.

A reversed picture of the rough sketch 2 is printed or drawn as shown in FIG. 4 on the upper surface of upper peelable paper 5 of a double-coated adhesive tape 7 having upper and lower peelable paper 5, 6, and then the upper and lower peelable paper 5, 6, and double-coated adhesive tape 7 are cut with scissors along a contour 4*a* of the picture as shown in FIG. 5. During this time, the picture 4 is cut out part by part from the peripheral portion thereof.

Figure 7:
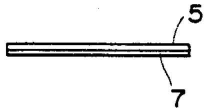
FIG. 7 is a front elevation of the same part of the double-coated adhesive tape from which the lower peelable tape has been removed.
Figure 8:
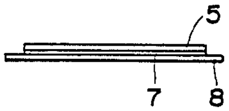
FIG. 8 is a front elevation of this double-coated adhesive tape to which the rear surface of Japan paper is fastened.
Figure 9:
FIG. 9 is a front elevation of the double-coated adhesive tape from which the peripheral portion of the Japan paper has been removed along the contour of the picture.
Figure 10:
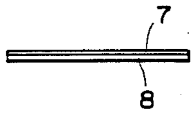
FIG. 10 is a front elevation of the double-coated adhesive tape from which the upper peelable paper has been removed.
Figure 11:
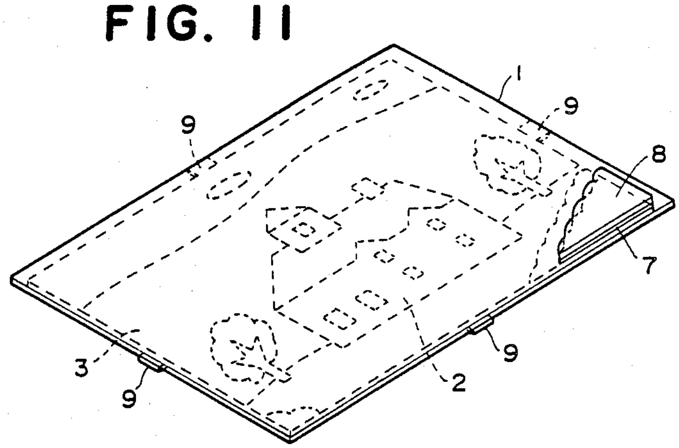
FIG. 11 is a perspective view of the transparent board to the upper surface of which the above Japan paper forming a part of the picture is fixed via the double-coated adhesive tape so that the picture is aligned with the rough sketch on the rough sketch-carrying plate.

As shown in FIG. 7, the lower peelable paper 6 is then removed from the double-coated adhesive tape 7, and the rear surface of Japan paper 8, which is a special paper made with an irregular mottled effect on the surface and, if necessary, may be substituted by figured paper, a cloth, leather, an unwoven cloth, aluminum foil, or a vinyl sheet, the size of which is slightly larger than that of the picture 4, is fastened as shown in FIG. 8 to the portion of the double-coated adhesive tape 7 from which the lower peelable paper 6 has been removed. The peripheral portion of the Japan paper 8 is then cut off with scissors along the contour 4a as shown in FIG. 9, and the upper peelable paper 5 is removed from the double-coated adhesive tape 7 as shown in FIG. 10. When the Japan paper is then turned upside down, the outer surface thereof faces in the upwardd direction. As a result, the picture formed by the Japan paper agrees with the rough sketch 2 on the rough sketch-carrying plate 3. The Japan paper 8 is then fastened to the upper surface of the transparent board 1 via the double-coated adhesive tape fixed to the lower surface thereof, as shown in FIG. 11, in such a manner that the picture formed by the Japan paper 8 is aligned with the rough sketch 2, which can be seen through the transparent board 1, on the sketch-carrying plate 3.

Figure 12:
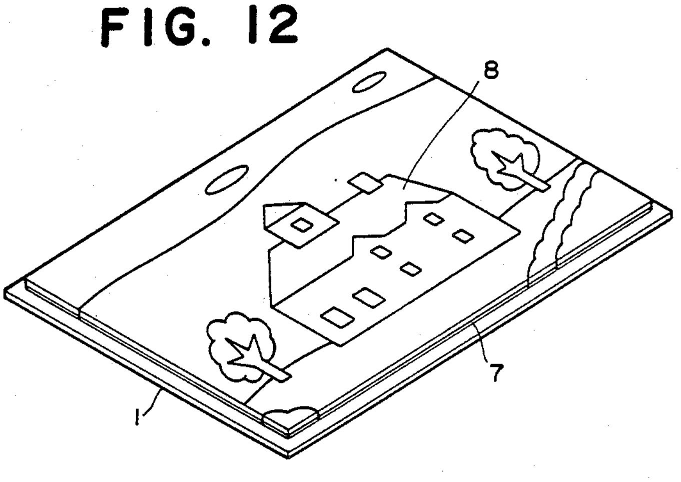
FIG. 12 is a perspective view of a pasted picture made according to the present invention.

The parts of the Japan paper 8 are fastened to the upper surface of the transparent board 1 as shown in FIG. 12, by repeating the above-described operation. Finally, the cellophane adhesive tape 9 is removed to detach the rough sketch-carrying plate 3 from the lower surface of the transparent board 1 to obtain a pasted picture according to the present invention.

Figure 13:
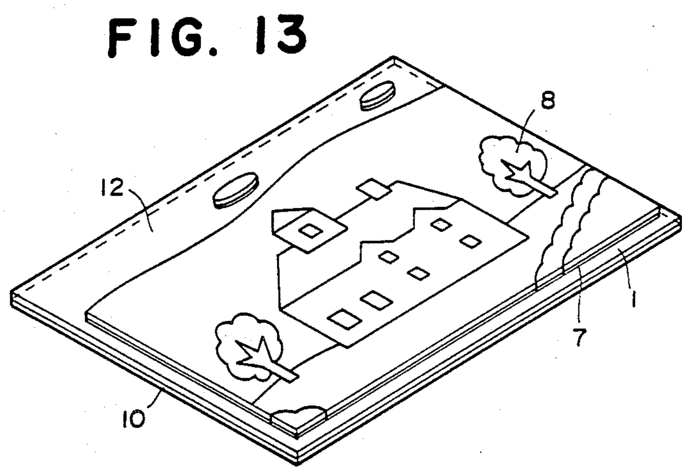
FIG. 13 is a perspective view of the pasted picture with a background plate attached to the lower surface of the transparent board.

According to the present invention, the transparent board 1 is used. Therefore, the portion of the pasted picture formed of the Japan paper 8 which corresponds to, for example, a blue sky portion 12 may not be fastened to the transparent board 1, i.e., this portion may be left transparent as shown in FIG. 13. If a blue background plate 10 is then attached to the relative portion of the lower surface of the transparent board 1, the blue sky portion 12 can be made easily. Accordingly, if various background plates, such as a solid color background plate, a colored background plate and a picture-carrying background plate are used, a desired pasted picture can be made freely.

As described above, the present invention is directed to a new method of manufacturing a pasted picture comprising the steps of sticking a plate 3 with a rough sketch 2 drawn thereon to the lower surface of a transparent board 1, drawing a reversed picture 4 of the rough sketch 2 on the supper surface of upper peelable paper 5 of a double-coated adhesive tape 7 having upper and lower peelable paper 5, 6, cutting off the upper and lower peelable paper 5, 6 and double-coated adhesive tape 7 along the contour 4a of the picture 4, removing the lower peelable paper 6 from the resultant double-coated adhesive tape 7 to which the picture 4 and upper and lower peelable paper 5, 6 are fixed, applying the rear surface of Japan paper 8 to the portion of the double-coated adhesive tape 7 from which the lower peelable paper 6 has been removed, cutting off the peripheral portion of the Japan paper 8 along the contour 4a of the picture 4, removing the upper peelable paper 5 from the double-coated adhesive tape 7, sticking the Japan paper 8 to the upper surface of the transparent board 1 via the double-coated adhesive tape 7 fixed to the rear surface of the Japan paper 8, in such a manner that the picture 4 is aligned with the rough sketch 2, which can be seen through the transparent board 1 on the rough sketch-carrying plate 3 from the lower surface of the transparent board 1. Owing to the use of the double-coated adhesive tape 7, a laborious pasting operation, which is required in a conventional method of this kind, becomes completely unnecessary during the fastneing of the Japan paper 8, which forms a pasted picture, to the transparent board 1. This enables a beautiful pasted picture to be made very easily by using scissors only. According to the present invention, the reversed picture 4 of the rough sketch 2 on the rough sketch-carrying plate 3 attached closely to the lower surface of the transparent board 1 is drawn on the upper surface of the upper peelable paper 5 of the double-coated adhesive tape 7. Therefore, if the rear surface of the Japan paper 8 is fastened to the portion of the double-coated adhesive tape 7 from which the lower peelable paper 6 has been removed, with the upper peelable paper 8 carries the adhesive surface-exposed double-coated adhesive tape 7. If the Japan paper 8 is then turned so that the outer surface thereof faces in the upward direction, the Japan paper can be placed in alignment with the rough sketch 2, which can be seen through the transparent board 1, on the rough sketch-carrying plate 3. Accordingly, if the Japan paper 8 is then fastened to the transparent board 1 so that the picture 4 is aligned with the rough sketch 2, a pasted picture can be simply obtained.

Since the transparent board 1 is used, the pasted picture and the background plate 10 attached to the lower surface of the transparent board 1 can also be combined. This enables various kinds of pasted pictures to be made without requiring any special techniques.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modification may be made to adapt a particular situation or material to the teachings of the invention without departing from the essential scope thereof. Therefore, it is intended that the invention will not be limited to the particular embodiment illustrated by the drawings and described in the specification as the best mode presently contemplated for carrying out this invention, but that the invention will include any embodiments falling within the description of the appended claims.

What is claimed is:

1. A method of manufacturing a pasted picture comprising the steps of:

providing a rough sketch on a rough sketch-carrying plate, sticking said rough sketch-carrying plate to a lower surface of a transparent board, providing a reversed picture of said rough sketch on an upper surface of an upper peelable paper of an upper and lower peelable papers carrying double-coated adhesive tape, cutting off said upper and lower peelable papers and said double-coated adhesive tape along the contour of said picture to form picture segments, removing said lower peelable paper from said picture segments and the upper and lower peelable paper-carrying double-coated adhesive tape, applying a rear surface of a decorative paper to the portion of said double-coated adhesive paper from which said lower peelable paper has been removed, cutting off a peripheral portion of said decorative paper along a contour of said picture removing said upper peelable paper from said double-coated adhesive tape, sticking said decorative paper to an upper surface of said transparent board through said double-coated adhesive tape fixed to said rear surface of said decorative paper so that said picture is aligned with said rough sketch on said rough sketch-carrying plate, and removing said rough sketch-carrying plate from the lower surface of said transparent board.

2. The method of manufacturing a pasted picture according to claim 1, wherein said transparent board is made of a transparent acrylic resin, and said decorative paper is Japan paper made with an irregular mottled effect on a surface thereof.

* * * * *